(12) United States Patent
Mallik et al.

(10) Patent No.: US 9,900,074 B2
(45) Date of Patent: Feb. 20, 2018

(54) CSI REQUEST PROCEDURE IN LTE/LTE-A WITH UNLICENSED SPECTRUM

(71) Applicant: QUALCOMM Incorporated, San Diego, CA (US)

(72) Inventors: Siddhartha Mallik, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/818,049

(22) Filed: Aug. 4, 2015

(65) Prior Publication Data

US 2016/0050004 A1 Feb. 18, 2016

Related U.S. Application Data

(60) Provisional application No. 62/036,296, filed on Aug. 12, 2014.

(51) Int. Cl.
| | |
|---|---|
| *H04B 7/06* | (2006.01) |
| *H04W 72/04* | (2009.01) |
| *H04W 24/10* | (2009.01) |
| *H04L 1/00* | (2006.01) |

(52) U.S. Cl.
CPC ......... *H04B 7/0626* (2013.01); *H04L 1/0026* (2013.01); *H04W 24/10* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 8,953,483 B2 * | 2/2015 | Noh | ...................... | H04L 1/1671 370/252 |
| 9,054,841 B2 * | 6/2015 | Ouchi | ................... | H04L 5/0048 |
| 9,237,583 B2 * | 1/2016 | Chen | ...................... | H04L 5/003 |

(Continued)

FOREIGN PATENT DOCUMENTS

WO WO-2012078565 A1 6/2012

OTHER PUBLICATIONS

International Search Report and Written Opinion—PCT/US2015/043758—ISA/EPO—Sep. 18, 2015.

*Primary Examiner* — Candal Elpenord
(74) *Attorney, Agent, or Firm* — Liem T. Do

(57) ABSTRACT

Channel state information (CSI) request procedures are disclosed for use in long term evolution (LTE)/LTE-Advanced (LTE-A) networks with unlicensed spectrum. Instead of relying on periodic reference signals which may not be transmitted because of failed clear channel assessment (CCA) operations, an aperiodic reference signal is defined that provides an on-demand reference signal and CSI request for user equipment (UE). The serving base station transmits an identifier, which signals that the aperiodic reference signal will be transmitted, either in the same subframe or a future subframe, and then transmits the aperiodic reference signal in the designated subframe. UEs served by the base station will receive the identifier, identify a CSI request, either implicitly through the identifier signal received from the base station or explicitly through a UE-specific CSI request, and then generate a CSI report based on the aperiodic reference signal for transmission back to the serving base station.

29 Claims, 7 Drawing Sheets

(56) References Cited

U.S. PATENT DOCUMENTS

| | | | |
|---|---|---|---|
| 2012/0058791 A1 | 3/2012 | Bhattad et al. | |
| 2012/0224557 A1* | 9/2012 | Noh | H04L 5/001 370/329 |
| 2013/0077574 A1* | 3/2013 | Ekpenyong | H04L 5/0023 370/329 |
| 2013/0100833 A1* | 4/2013 | Xu | H04W 52/42 370/252 |
| 2013/0107832 A1 | 5/2013 | Kim et al. | |
| 2014/0126476 A1* | 5/2014 | Kang | H04L 1/0026 370/328 |
| 2014/0211737 A1* | 7/2014 | Takeda | H04W 52/146 370/329 |

\* cited by examiner

CSI REQUEST PROCEDURE IN LTE/LTE-A WITH UNLICENSED SPECTRUM

CROSS-REFERENCE TO RELATED APPLICATIONS

This application claims the benefit of U.S. Provisional Patent Application No. 62/036,296, entitled, "CSI REQUEST PROCEDURE IN LTE/LTE-A WITH UNLICENSED SPECTRUM," filed on Aug. 12, 2014, which is expressly incorporated by reference herein in its entirety.

BACKGROUND

Field

Aspects of the present disclosure relate generally to wireless communication systems, and more particularly, to channel state information (CSI) request procedures in long term evolution (LTE)/LTE-Advanced (LTE-A) with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes transmitting, by a base station, an identifier signaling presence of an aperiodic reference signal, transmitting, by the base station, the aperiodic reference signal, and receiving, by the base station, a channel state information (CSI) report from one or UEs, wherein the CSI report is based on the aperiodic reference signal.

In an additional aspect of the disclosure, a method of wireless communication includes detecting, by a UE, an identifier signaling presence of an aperiodic reference signal in a subframe, identifying, by the UE, a CSI request from a base station, generating, by the UE, a CSI report based on the aperiodic reference signal in response to the CSI request, and transmitting, by the UE, the CSI report to the base station.

In an additional aspect of the disclosure, an apparatus configured for wireless communication includes means for transmitting, by a base station, an identifier signaling presence of an aperiodic reference signal, means for transmitting, by the base station, the aperiodic reference signal, and means for receiving, by the base station, a CSI report from one or UEs, wherein the CSI report is based on the aperiodic reference signal.

In an additional aspect of the disclosure, an apparatus configured for wireless communication includes means for detecting, by a UE, an identifier signaling presence of an aperiodic reference signal in a subframe, means for identifying, by the UE, a CSI request from a base station, means for generating, by the UE, a CSI report based on the aperiodic reference signal in response to the CSI request, and means for transmitting, by the UE, the CSI report to the base station.

In an additional aspect of the disclosure, a non-transitory computer-readable medium has program code recorded thereon. This program code includes code to transmit, by a base station, an identifier signaling presence of an aperiodic reference signal, code to transmit, by the base station, the aperiodic reference signal, and code to receive, by the base station, a CSI report from one or UEs, wherein the CSI report is based on the aperiodic reference signal.

In an additional aspect of the disclosure, a non-transitory computer-readable medium has program code recorded thereon. This program code includes code to detect, by a UE, an identifier signaling presence of an aperiodic reference signal in a subframe, code to identify, by the UE, a CSI request from a base station, code to generate, by the UE, a CSI report based on the aperiodic reference signal in response to the CSI request, and code to transmit, by the UE, the CSI report to the base station.

In an additional aspect of the disclosure, an apparatus includes at least one processor and a memory coupled to the processor. The processor is configured to transmit, by a base station, an identifier signaling presence of an aperiodic reference signal, to transmit, by the base station, the aperiodic reference signal, and to receive, by the base station, a CSI report from one or UEs, wherein the CSI report is based on the aperiodic reference signal.

In an additional aspect of the disclosure, an apparatus includes at least one processor and a memory coupled to the processor. The processor is configured to detect, by a UE, an identifier signaling presence of an aperiodic reference signal in a subframe, to identify, by the UE, a CSI request from a base station, to generate, by the UE, a CSI report based on the aperiodic reference signal in response to the CSI request, and to transmit, by the UE, the CSI report to the base station.

DETAILED DESCRIPTION

Figure 1:
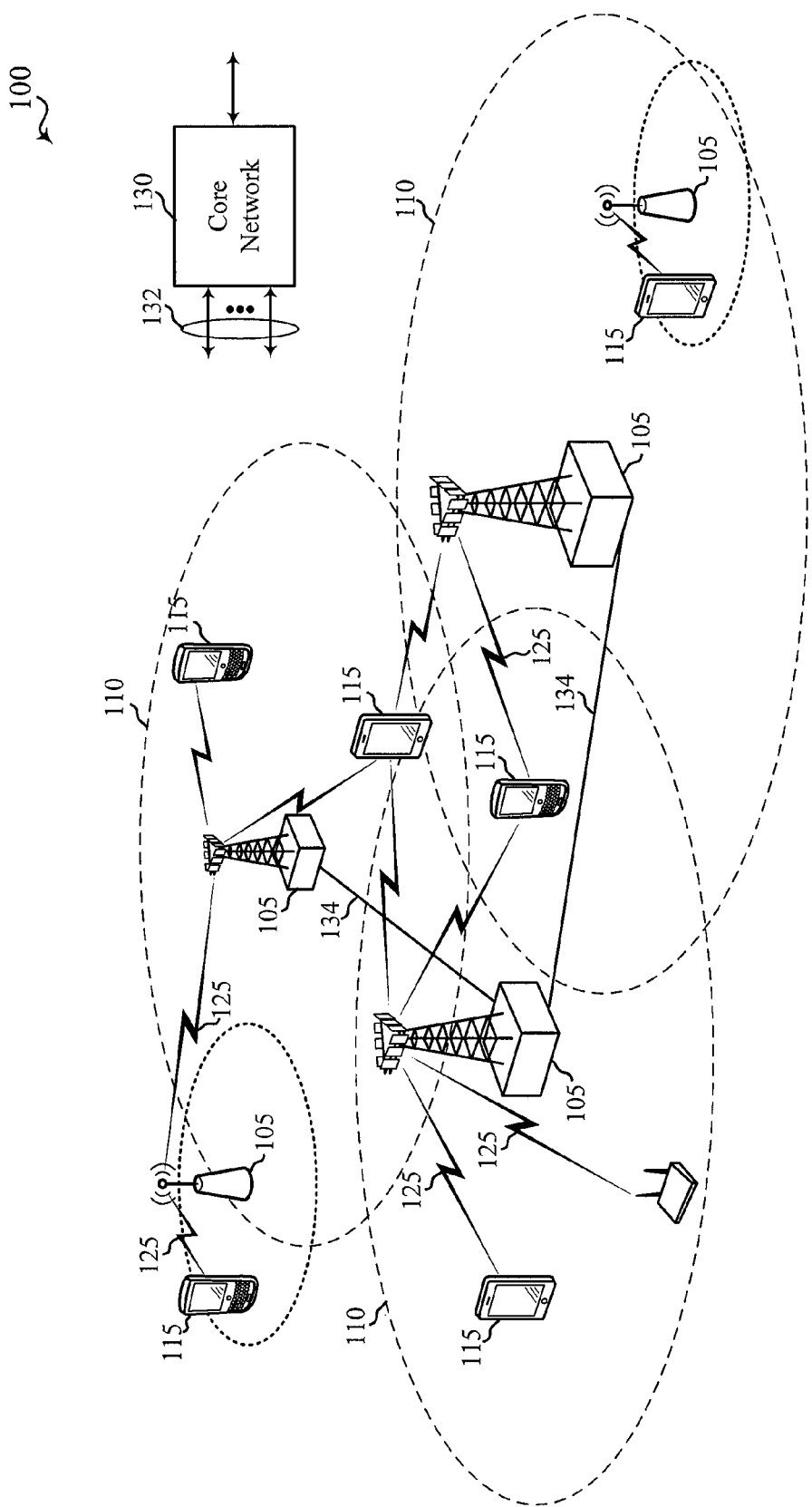
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-17.

Figure 2A:
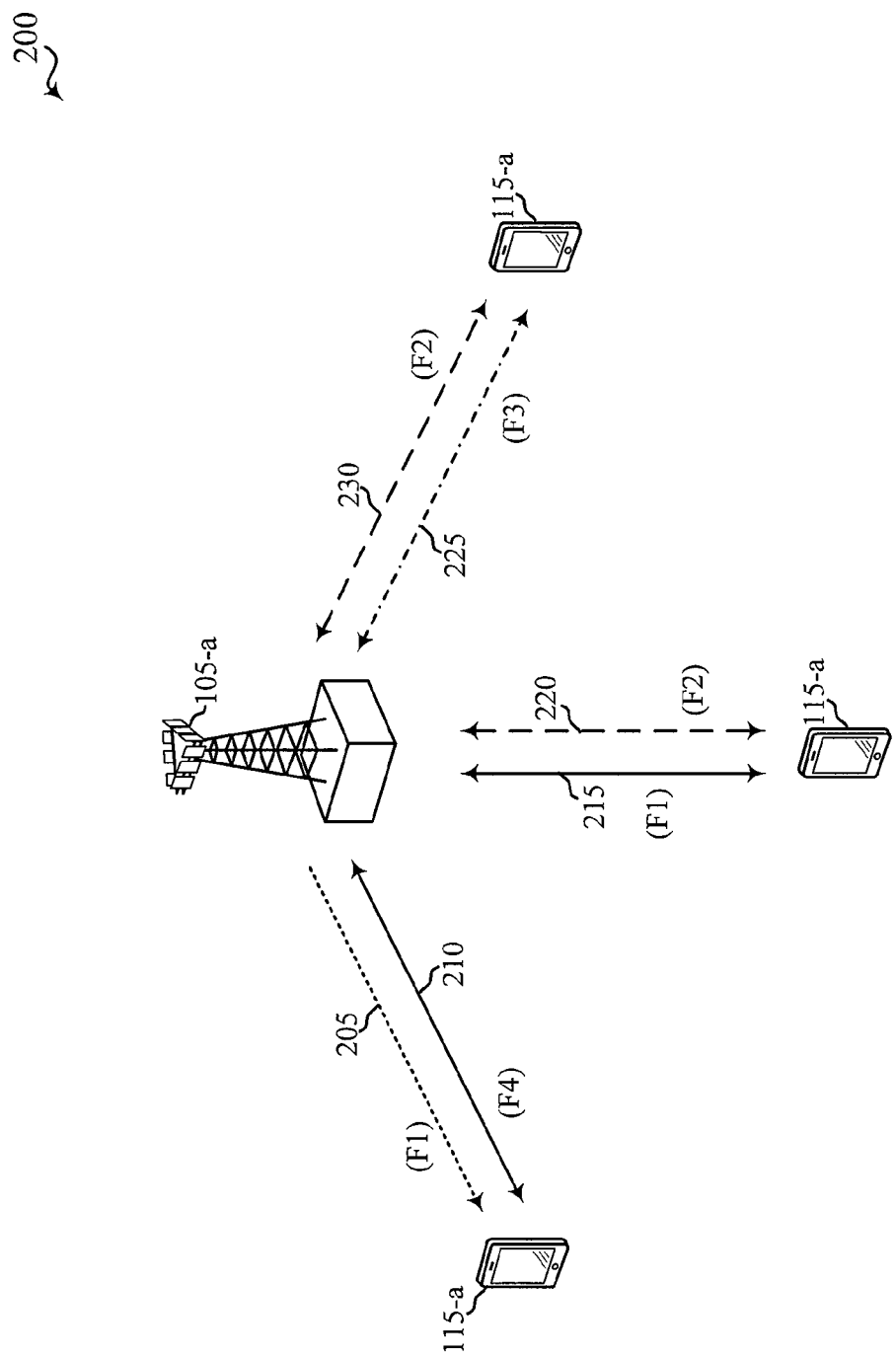
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
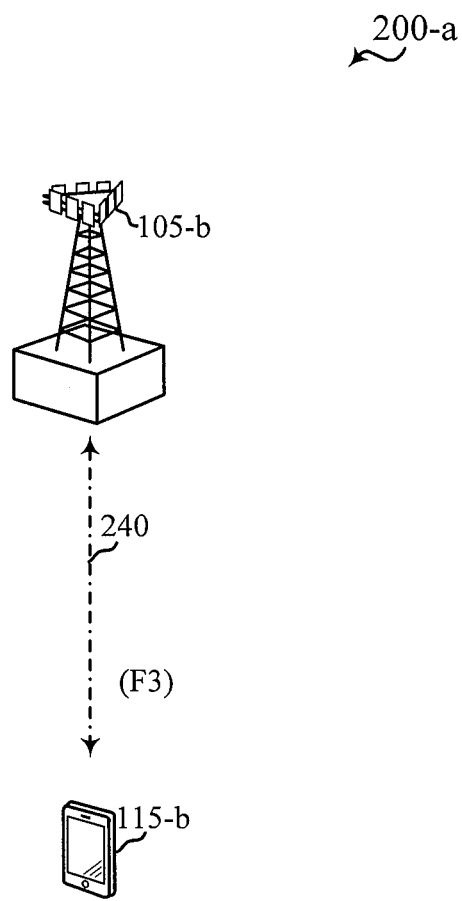
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
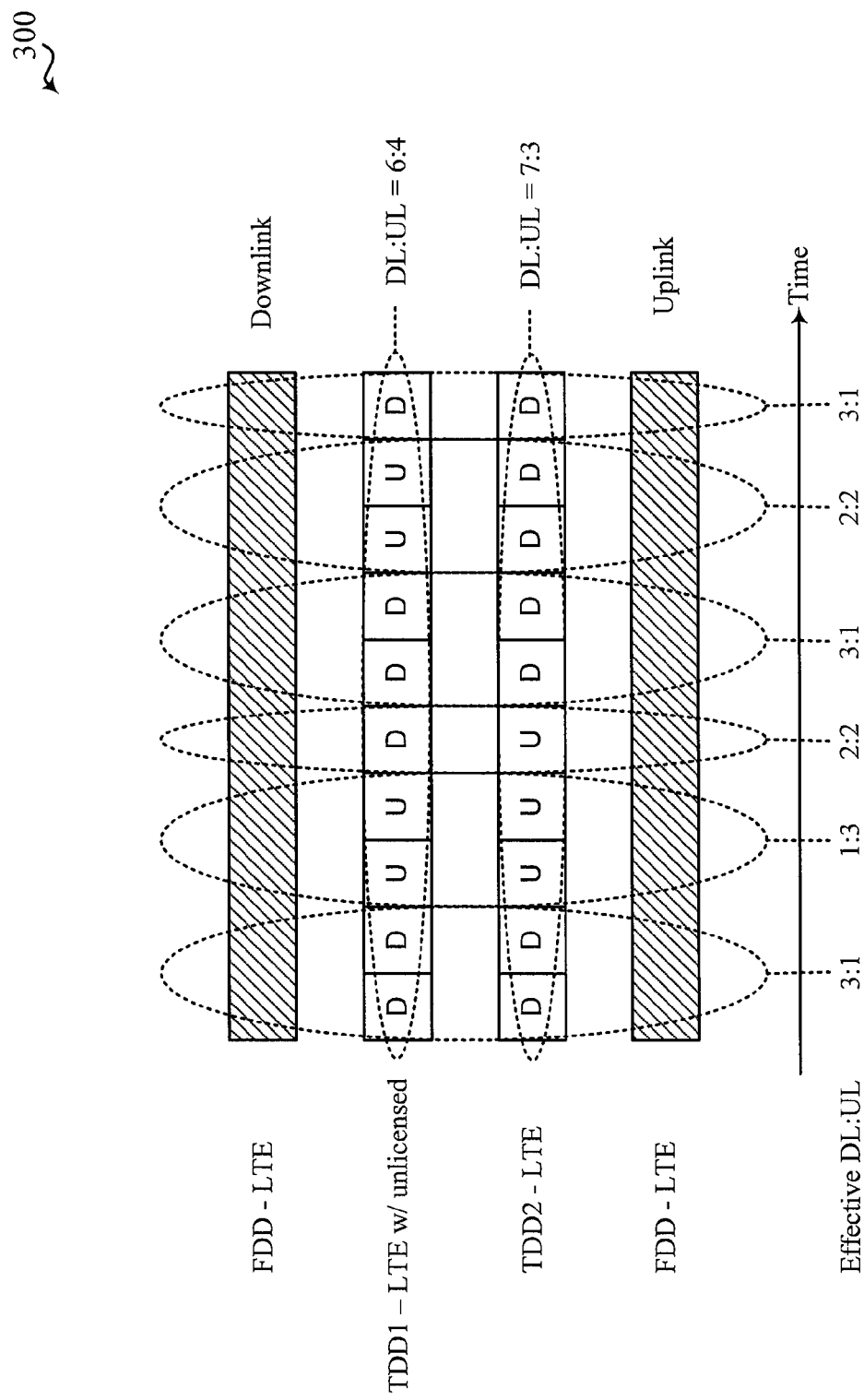
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
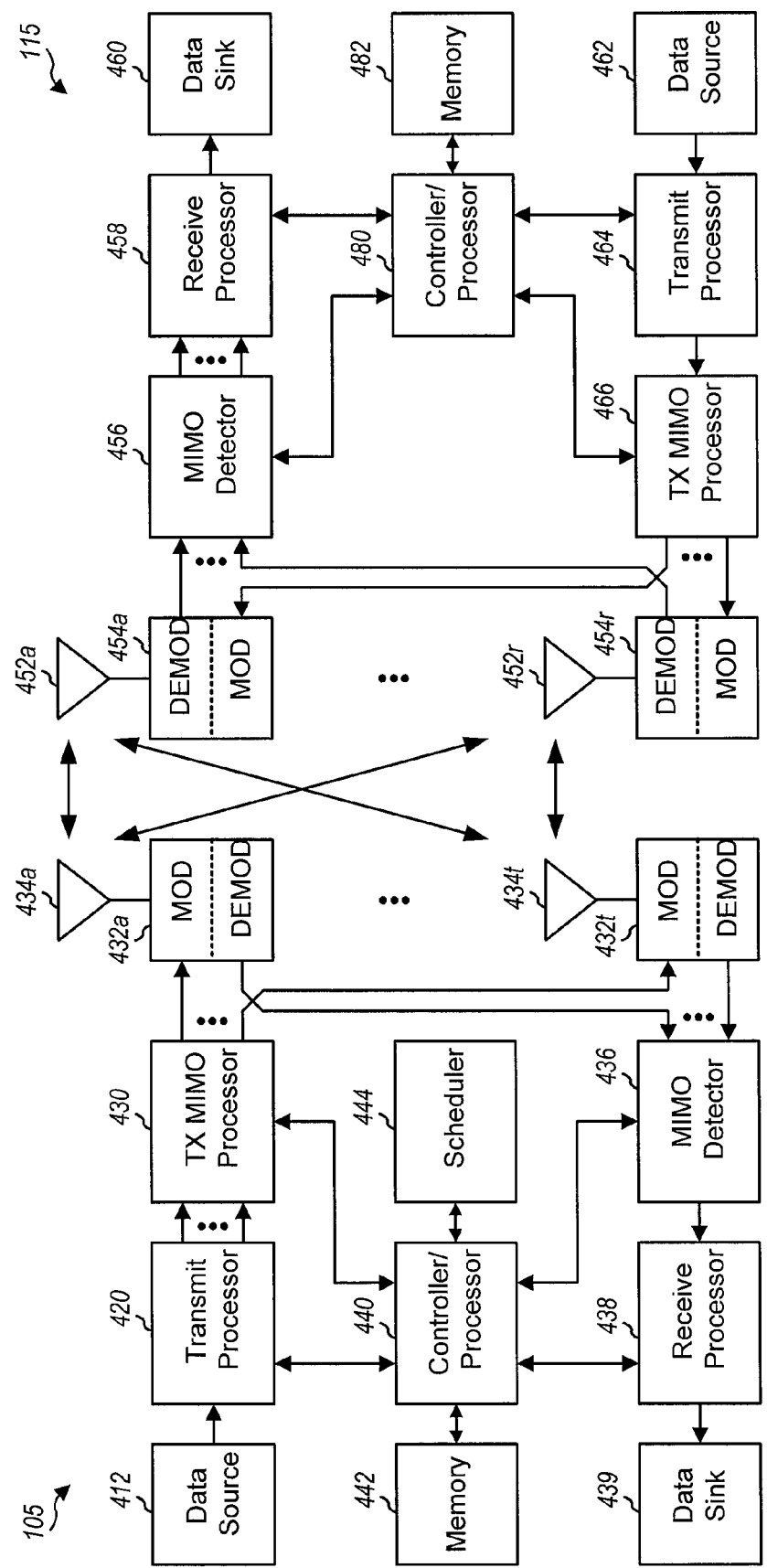
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5 and 6, and/or other processes for the techniques described herein. The memories 442 and 482 may store data and program codes for the eNB 105 and the UE 115, respectively. A scheduler 444 may schedule UEs for data transmission on the downlink and/or uplink.

In LBT-compliant communication systems, such as LTE/LTE-A networks with unlicensed spectrum, reference signals used for determining channel state information (CSI) (e.g., CSI-RS, enhanced common reference signal (e-CRS), etc.) are typically transmitted contingent on CCA clearance. When CCA operations do not clear frequently on the CSI-RS subframe, the resulting CSI reports may be stale and inaccurate. One solution to prevent stale CSI reports would be to increase periodicity of CSI-RS transmissions. However, this would potentially incur an increased overhead and contribute to additional interference to other UEs in the deployment Various aspects of the present disclosure are directed to transmitting aperiodic reference signals that include sufficient reference signals for CSI processing. For example, in selected aspects, such aperiodic reference signals may include CSI-RS and interference measurement resources (IMRs) transmitted in various patterns across a single subframe. CSI-RS may be used by the UE to perform channel estimation, while the IMR may be used to estimate channel interference. In additional aspects, the aperiodic reference signal may include the common reference signal (CRS). When the CRS is used for the aperiodic reference signal, both channel and interference estimation may be performed by the UE using CRS. Because this reference signal subframe is transmitted in an aperiodic manner, the transmitting base station may provide notification of the presence of such aperiodic reference signals using a downlink control signal, such as through PDCCH. For example, such a notification of the presence of the aperiodic reference signal may be located in the common search space of the PDCCH, so that UEs within the coverage area of the transmitting base station may detect the presence indicator. The notification may be sent in the same subframe as the aperiodic reference signal or may be transmitted in a prior subframe (e.g., 1 or more subframes prior to aperiodic reference signal transmission).

It should be noted that in various aspects of the present disclosure, multiple configurations of the aperiodic reference signal may be available for the base station to select. These configurations define the various patterns of reference signals found in the subframe and, thus, may provide a mapping of the particular reference signal to a tone location within the subframe. For example, the configuration may map which tones of the subframe carry CSI-RS and which tones carry IMR, and may include identification of the CSI-RS and IMR configurations currently defined in supporting LTE/LTE-A standards. The base station may semi-statically select one or more aperiodic reference signal configurations for transmission. The particular configuration selected from the semi-statically selected set of configurations may then be indicated by the base station in the grant or presence indicator of the PDCCH transmission. Any UEs in the communication area of the transmitting base station would monitor for this PDCCH information.

It should further be noted that, in order to avoid a UE confusing the aperiodic reference signal with data transmissions, PDSCH would be rate matched around the aperiodic reference signal.

Figure 5:
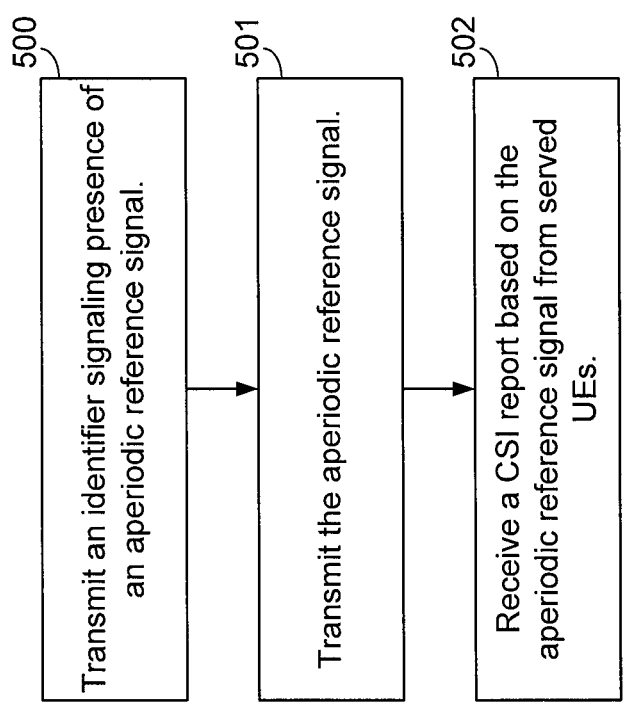

FIG. 5 is a functional block diagram illustrating example blocks executed to implement one aspect of the present disclosure. At block 500, a base station transmits an identifier that signals the presence of an aperiodic reference signal. As noted, such an identifier may be transmitted in the common search space of a control channel, such as PDCCH. At block 501, the base station transmits the aperiodic reference signal. In one example aspect, the aperiodic reference signal includes a configuration of CSI-RS and IMR signals across a single subframe. The base station may select a particular configuration from multiple configurations of the aperiodic reference signal and indicate the current configuration in the identifier signal. At block 502, the base station would then receive a CSI report from any of the UEs served by the base station. The CSI report would be based on the aperiodic reference signal, such as a channel estimation based on the CSI-RS and interference measurement of the IMR.

From the UE perspective, with an aperiodic reference signal, the UE should detect an aperiodic CSI request in order to perform the CSI operations on the aperiodic reference signal. Various aspects of the present disclosure may provide for either explicit or implicit CSI requests. For example, an aperiodic CSI report may be requested individually for each UE through an additional request signal transmitted from the base station to the specific UE. Such UE-specific CSI requests may be included in the UE-specific search space of a control channel, such as PDCCH. The UE-specific aperiodic CSI request may also include identification of the type of report requested. For instance, the UE-specific request may request a wideband or narrowband report either with or without a precoding matrix indicator (PMI).

Alternatively, the aperiodic CSI request may be implicit and common to all UEs, or to a group of UEs, served by the transmitting base station. In one example of an implicit aperiodic CSI request, the presence indicator in the common search space of the control channel may implicitly trigger each UE to report CSI based on the aperiodic reference signal. Thus, when a UE detects the presence indicator in the common search space of a control channel, such as PDCCH, it will automatically begin the CSI report operations when the aperiodic reference signal is detected.

Figure 6:
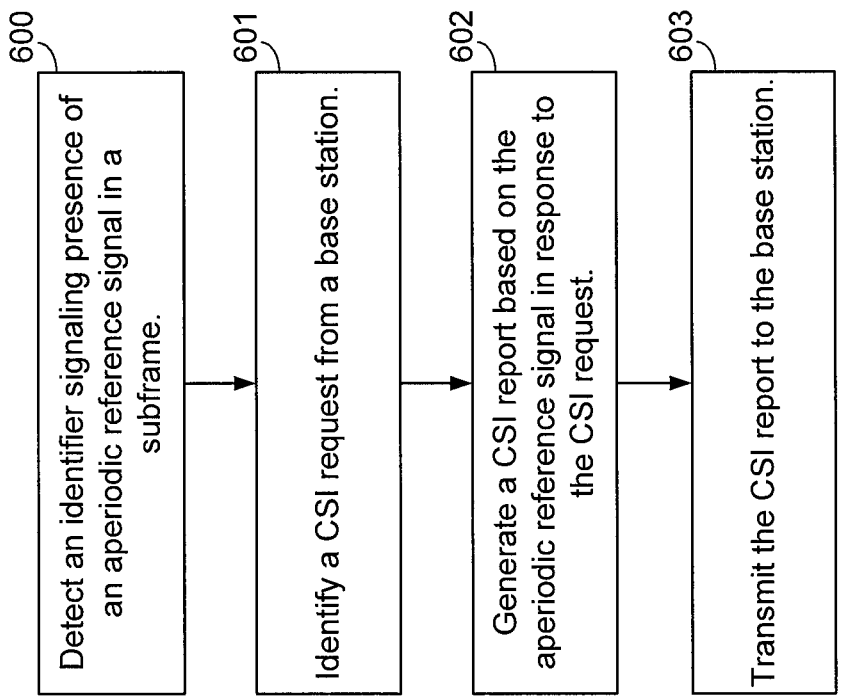
FIGS. 5 and 6 are functional block diagrams illustrating example blocks executed to implement one aspect of the present disclosure.

FIG. 6 is a functional block diagram illustrating example blocks executed to implement one aspect of the present disclosure. At block 600, a UE detects an identifier that signals the presence of an aperiodic reference signal in a subframe. The identifier may indicate that the aperiodic reference signal is in the same subframe as the indicator, or it may alternatively indicate that the aperiodic reference signal will be located in a specific later subframe. At block 601, the UE identifies a CSI request from the base station. This CSI request may be identified implicitly, such as through detection of the identifier signal, or it may be explicitly identified, through detection of a UE-specific request from the base station. At block 602, in response to the identified request, the UE generates a CSI report based on operations conducted on the aperiodic reference signal. For example, the UE may determine a channel estimate using a CSI-RS contained within the aperiodic reference signal and may determine channel interference using IMR also contained within the aperiodic reference signal. At block 603, the UE transmits the CSI report to the base station.

Figure 7:
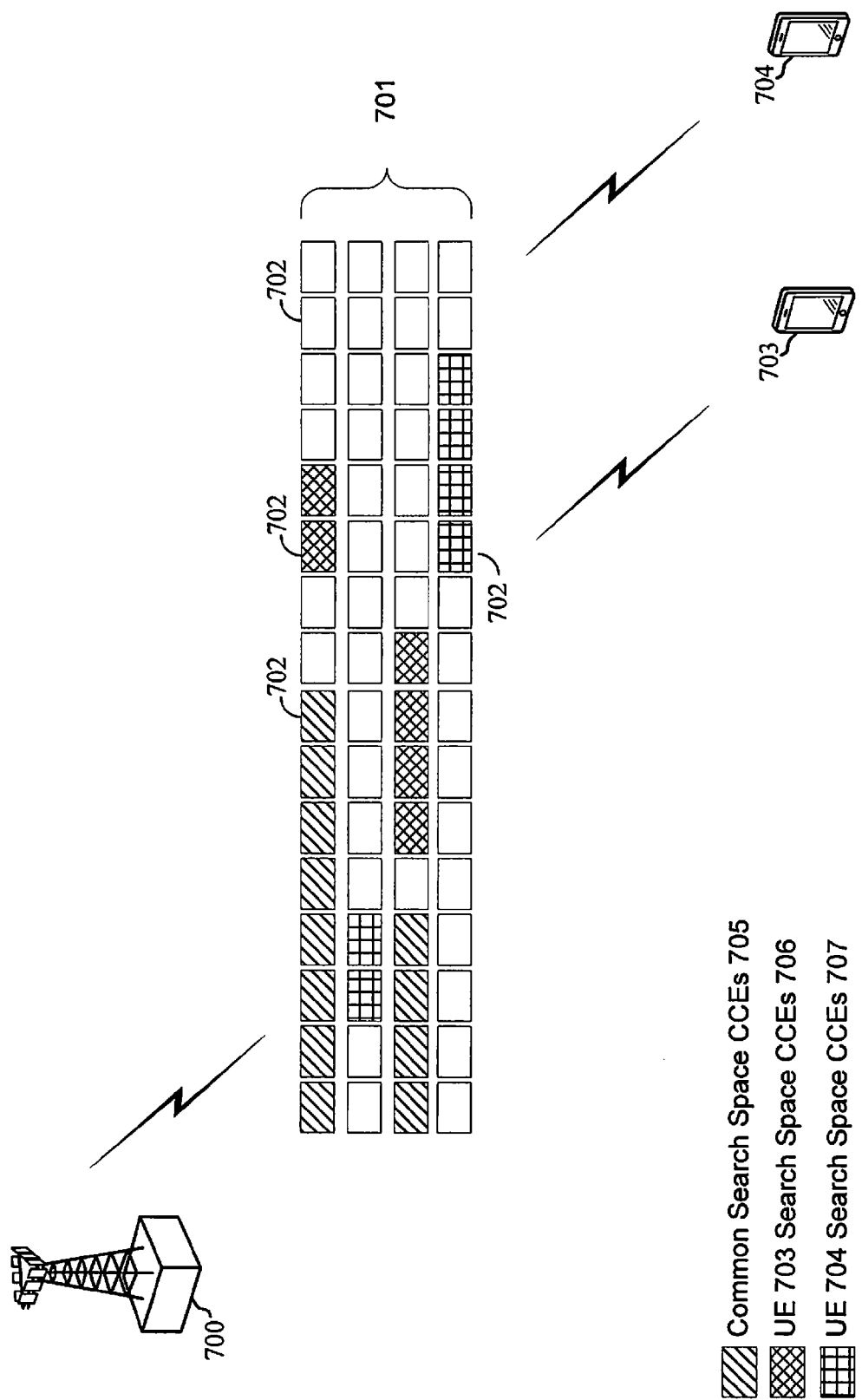
FIG. 7 is a block diagram illustrating a base station and UEs configured according to one aspect of the present disclosure.

FIG. 7 is a block diagram illustrating a base station 700 and UEs 702-703 configured according to one aspect of the present disclosure. Base station 700 and UEs 702-703 include similar componentry and functionality to base station 105 and UEs 115, respectively, as described and illustrated in FIG. 1. In one aspect of the present disclosure, base station 105 transmits PDCCH over transmission stream 701. Transmission stream 701 include multiple control channel elements (CCEs) 702, which may include PDCCH transmissions. The CCEs 702 illustrated in FIG. 7 represent only a portion of the total CCEs transmitted at any given point by base station 700. PDCCH includes both common search space and UE-specific search space. Thus, each of CCEs 702 may be a common search space CCE, a UE-specific search space, or another type of transmitted signal. UEs 703 and 704 are served by base station 700 and receive transmission stream 701. Each of UEs 703 and 704 knows to access common search space CCEs 705 to receive system information common to all UEs served by base station 700. Furthermore, UE 703 knows to access UE 703 search space CCEs 706 to receive system information from base station 700 specifically directed to UE 703. Similarly, UE 704 knows to access UE 704 search space CCEs 707 to receive system information from base station 700 specifically directed to UE 704.

In one aspect of the present disclosure, base station 700 transmits an identifier within common search space CCEs 705 that indicates the presence of an aperiodic reference signal. The identifier may indicate that the aperiodic reference signal is present in the same subframe, or it may identify which subsequent subframe the aperiodic reference signal will be located. In a first aspect of the present disclosure, UEs 703 and 704 will implicitly use the detected identifier within common search space 705 as an aperiodic CSI request. Thus, both UEs 703 and 704 will generate a CSI report based on the aperiodic reference signal when that signal is received.

In another aspect of the present disclosure, base station 700 transmits the identifier within common search space CCEs 705 and also transmits an aperiodic CSI request to UE 703 located in UE 703 search space CCEs 706 and an aperiodic CSI request to UE 704 located in UE 704 search space CCEs 707. The UE-specific aperiodic CSI requests may also include the type of CSI reports requested from UEs 703 and 704. For example, the aperiodic CSI request to UE 703 may request a narrowband report with PMI, while the aperiodic CSI request to UE 704 may request a wideband report without PMI. Thus, UEs 703 and 704 know when and where the aperiodic reference signal will be transmitted based on the identifier in common search space CCEs 705 and will also know to generate a certain type of CSI report through receipt of the UE-specific CSI request from base station 700 in their corresponding UE-specific search space.

It should be noted that, in additional aspects of the present disclosure, base station 700 may semi-statically select a configuration for the aperiodic reference signal. This selected configuration may then be communicated to UEs 703 and 704 through the identifier transmitted in common search space CCEs 705.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) or any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining, at a base station, at an aperiodic interval, to transmit an aperiodic reference signal;
    providing, in response to the determining to transmit the aperiodic reference signal at the aperiodic interval, an identifier, wherein the identifier signals presence of the aperiodic reference signal;
    transmitting, by the base station, over a physical downlink control channel (PDCCH), the identifier signaling the presence of the aperiodic reference signal;
    transmitting, by the base station, the aperiodic reference signal and a physical downlink shared channel (PDSCH) rate matched around the aperiodic reference signal; and
    receiving, by the base station, a channel state information (CSI) report from one or more user equipments (UEs), wherein the CSI report is based on the aperiodic reference signal.

2. The method of claim 1, further including:
    transmitting, by the base station, a UE-specific CSI request to each of the one or more UEs.

3. The method of claim 2, wherein the UE-specific CSI request includes identification of a type of CSI report requested.

4. The method of claim 1, wherein the identifier is transmitted in a common search space of a control channel.

5. The method of claim 1, wherein the aperiodic reference signal includes a pattern of reference signal resources transmitted on a single subframe.

6. The method of claim 5, further including:
    semi-statically configuring, by the base station, the pattern of reference signal resources from a plurality of patterns of reference signal resources, wherein the identifier further identifies the pattern of reference signal resources configured.

7. The method of claim 5, wherein the reference signal resources include at least one of:
    a CSI-reference signal (CSI-RS);
    an interference measurement resource (IMR); or
    a common reference signal (CRS).

8. The method of claim 1, wherein the identifier and the aperiodic reference signal are transmitted in a same subframe; or
    wherein the identifier is transmitted in a first subframe and the aperiodic reference signal is transmitted on a different subframe after the first subframe.

9. A method of wireless communication, comprising:
    detecting, by a user equipment (UE), an identifier signaling presence of an aperiodic reference signal in a subframe, wherein a physical downlink shared channel (PDSCH) is rate matched around the aperiodic reference signal, wherein the identifier is provided in response to a determination to transmit the aperiodic reference signal at an aperiodic interval, wherein the identifier is detected over a physical downlink control channel (PDCCH);
    identifying, by the UE, a channel state information (CSI) request from a base station;
    generating, by the UE, a CSI report based on the aperiodic reference signal in response to the CSI request; and
    transmitting, by the UE, the CSI report to the base station.

10. The method of claim 9, wherein the identifying the CSI request includes one of:
    receiving a UE-specific CSI request from the base station; or
    the detecting of the identifier in a common search space of a control channel from the base station.

11. The method of claim 10, wherein the UE-specific CSI request includes identification of a type of CSI report requested.

12. The method of claim 9, wherein the aperiodic reference signal includes a pattern of reference signal resources transmitted on a single subframe.

13. The method of claim 12, wherein the identifier further identifies the pattern of reference signal resources from a plurality of patterns of reference signal resources.

14. The method of claim 12, wherein the reference signal resources include at least one of:
    a CSI-reference signal (CSI-RS);
    an interference measurement resource (IMR); or
    a common reference signal (CRS).

15. The method of claim 9, wherein the identifier and the aperiodic reference signal are received in a same subframe; or
    wherein the identifier is received in a first subframe and the aperiodic reference signal is received on a different subframe after the first subframe.

16. An apparatus configured for wireless communication, the apparatus comprising:
    at least one processor; and
    a memory coupled to the at least one processor,
    wherein the at least one processor is configured:
        to determine, at a base station, at an aperiodic interval, to transmit an aperiodic reference signal;
        to provide, in response to the determination to transmit the aperiodic reference signal at the aperiodic interval, an identifier, wherein the identifier signals presence of the aperiodic reference signal;
        to transmit, by the base station, over a physical downlink control channel (PDCCH), the identifier signaling the presence of the aperiodic reference signal;
        to transmit, by the base station, the aperiodic reference signal and a physical downlink shared channel (PDSCH) rate matched around the aperiodic reference signal; and
        to receive, by the base station, a channel state information (CSI) report from one or more user equipments (UEs), wherein the CSI report is based on the aperiodic reference signal.

17. The apparatus of claim 16, further including configuration of the at least one processor to transmit, by the base station, a UE-specific CSI request to each of the one or more UEs.

18. The apparatus of claim 17, wherein the UE-specific CSI request includes identification of a type of CSI report requested.

19. The apparatus of claim 16, wherein the identifier is transmitted in a common search space of a control channel.

20. The apparatus of claim 16, wherein the aperiodic reference signal includes a pattern of reference signal resources transmitted on a single subframe.

21. The apparatus of claim 20, further including configuration of the at least one processor to semi-statically configure, by the base station, the pattern of reference signal resources from a plurality of patterns of reference signal resources, wherein the identifier further identifies the pattern of reference signal resources configured.

22. The apparatus of claim 20, wherein the reference signal resources include at least one of:
    a CSI-reference signal (CSI-RS);

an interference measurement resource (IMR); or a common reference signal (CRS).

23. The apparatus of claim 16, wherein the identifier and the aperiodic reference signal are transmitted in a same subframe; or wherein the identifier is transmitted in a first subframe and the aperiodic reference signal is transmitted on a different subframe after the first subframe.

24. An apparatus configured for wireless communication, the apparatus comprising:

at least one processor; and a memory coupled to the at least one processor, wherein the at least one processor is configured:

to detect, by a user equipment (UE), an identifier signaling presence of an aperiodic reference signal in a subframe, wherein a physical downlink shared channel (PDSCH) is rate matched around the aperiodic reference signal, wherein the identifier is provided in response to a determination to transmit the aperiodic reference signal at an aperiodic interval, wherein the identifier is detected over a physical downlink control channel (PDCCH);

to identify, by the UE, a channel state information (CSI) request from a base station;

to generate, by the UE, a CSI report based on the aperiodic reference signal in response to the CSI request; and to transmit, by the UE, the CSI report to the base station.

25. The apparatus of claim 24, wherein the configuration of the at least one processor to identify the CSI request includes one of:

configuration of the at least one processor to receive a UE-specific CSI request from the base station; or the configuration of the at least one processor to detect of the identifier in a common search space of a control channel from the base station.

26. The apparatus of claim 25, wherein the UE-specific CSI request includes identification of a type of CSI report requested.

27. The apparatus of claim 24, wherein the aperiodic reference signal includes a pattern of reference signal resources transmitted on a single subframe, and wherein the identifier further identifies the pattern of reference signal resources from a plurality of patterns of reference signal resources.

28. The apparatus of claim 27, wherein the reference signal resources include at least one of:

a CSI-reference signal (CSI-RS);

an interference measurement resource (IMR); or a common reference signal (CRS).

29. The apparatus of claim 24, wherein the identifier and the aperiodic reference signal are received in a same subframe; or wherein the identifier is received in a first subframe and the aperiodic reference signal is received on a different subframe after the first subframe.

\* \* \* \* \*